United States Patent
Blanton et al.

(10) Patent No.: US 11,313,600 B2
(45) Date of Patent: Apr. 26, 2022

(54) MODULATING REHEAT OPERATION OF HVAC SYSTEM WITH MULTIPLE CONDENSER COILS

(71) Applicant: Johnson Controls Technology Company, Auburn Hills, MI (US)

(72) Inventors: Norman J. Blanton, Norman, OK (US); Zhiwei Huang, Moore, OK (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 163 days.

(21) Appl. No.: 16/595,136

(22) Filed: Oct. 7, 2019

(65) Prior Publication Data

US 2021/0102738 A1    Apr. 8, 2021

(51) Int. Cl.
*F25B 49/02* (2006.01)
*F25B 39/04* (2006.01)
*F25B 13/00* (2006.01)

(52) U.S. Cl.
CPC .............. *F25B 49/02* (2013.01); *F25B 13/00* (2013.01); *F25B 39/04* (2013.01)

(58) Field of Classification Search
CPC ...... F25B 2400/0403; F25B 2600/2501; F25B 2600/2507; F25B 2700/195; F25B 39/04; F25B 41/24; F25B 49/027; F25B 6/02
See application file for complete search history.

(56) References Cited

U.S. PATENT DOCUMENTS

| | | | |
|---|---|---|---|
| 3,631,686 A * | 1/1972 | Kautz | F24F 3/0525 62/173 |
| 3,921,413 A * | 11/1975 | Kohlbeck | F24F 3/153 62/173 |
| 6,666,040 B1 | 12/2003 | Groenewold et al. | |
| 6,955,057 B2 | 10/2005 | Taras et al. | |
| 7,219,505 B2 | 5/2007 | Weber et al. | |
| 7,434,415 B2 | 10/2008 | Knight et al. | |
| 7,559,207 B2 * | 7/2009 | Knight | F25B 49/027 62/115 |
| 7,980,087 B2 | 7/2011 | Anderson et al. | |
| 9,322,581 B2 * | 4/2016 | Blanton | F24F 11/30 |
| 9,470,445 B2 | 10/2016 | Burns | |
| 9,964,346 B2 | 5/2018 | Hua | |
| 9,989,289 B2 | 6/2018 | Zolli et al. | |
| 10,184,688 B2 | 1/2019 | Burg et al. | |
| 2008/0229764 A1 * | 9/2008 | Taras | F25B 6/02 62/90 |
| 2012/0272669 A1 * | 11/2012 | Blanton | F24F 1/00077 62/89 |
| 2017/0030621 A1 | 2/2017 | Hung | |
| 2018/0231293 A1 * | 8/2018 | Blanton | F25B 49/027 |
| 2019/0107299 A1 | 4/2019 | Locke et al. | |

* cited by examiner

*Primary Examiner* — Henry T Crenshaw
(74) *Attorney, Agent, or Firm* — Fletcher Yoder, P.C.

(57) ABSTRACT

A heating, ventilation, and/or air conditioning (HVAC) unit includes a refrigerant circuit including a reheat coil and a condenser system, a first valve disposed along the refrigerant circuit and configured to modulate refrigerant flow to the reheat coil and to the condenser system, and a second valve disposed along the refrigerant circuit downstream of the first valve relative to a direction of the refrigerant flow through the refrigerant circuit. The condenser system includes a first condenser coil and a second condenser coil, and the second valve is configured to be actuated to control refrigerant flow to the second condenser coil.

26 Claims, 10 Drawing Sheets

MODULATING REHEAT OPERATION OF HVAC SYSTEM WITH MULTIPLE CONDENSER COILS

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. The HVAC system may include reheat functionality, which may be used to control a humidity or moisture content of the supply air flow. However, implementation of the reheat functionality may affect a performance of the HVAC system, such as the ability of the HVAC system to efficiency condition the air flow.

SUMMARY

In one embodiment, a heating, ventilation, and/or air conditioning (HVAC) unit includes a refrigerant circuit including a reheat coil and a condenser system, a first valve disposed along the refrigerant circuit and configured to modulate refrigerant flow to the reheat coil and to the condenser system, and a second valve disposed along the refrigerant circuit downstream of the first valve relative to a direction of the refrigerant flow through the refrigerant circuit. The condenser system includes a first condenser coil and a second condenser coil, and the second valve is configured to be actuated to control refrigerant flow to the second condenser coil.

In one embodiment, a heating, ventilation, and/or air conditioning (HVAC) unit includes a condenser system having a plurality of condenser coils along a refrigerant circuit and configured to enable heat transfer between a refrigerant in the refrigerant circuit and an ambient air flow. The condenser system includes a first condenser coil and a second condenser coil. The HVAC unit also includes a reheat heat exchanger disposed along the refrigerant circuit and configured to enable heat transfer between the refrigerant and a supply air flow, and a first valve disposed along the refrigerant circuit and configured to direct the refrigerant from a compressor of the refrigerant circuit to the condenser system, the reheat heat exchanger, or both. The HVAC unit further includes a second valve disposed along the refrigerant circuit and upstream of the second condenser coil relative to a direction of refrigerant flow through the condenser system, in which the second valve is configured to selectively control refrigerant flow through the second condenser coil.

In one embodiment, a heating, ventilation, and/or air conditioning (HVAC) unit includes a refrigerant circuit configured to circulate a refrigerant, a first condenser coil of the refrigerant circuit, a second condenser coil of the refrigerant circuit positioned in a parallel arrangement with the first condenser coil relative to refrigerant flow through the refrigerant circuit, and a first valve of the refrigerant circuit having an inlet configured to receive the refrigerant from a compressor of the HVAC unit, a first outlet configured to direct refrigerant toward a reheat coil of the HVAC unit, and a second outlet configured to direct the refrigerant toward the first condenser coil and the second condenser coil. The HVAC unit further includes a second valve of the refrigerant circuit actuatable to block flow of refrigerant through the second condenser coil and a controller communicatively coupled to the second valve. The controller is configured to receive feedback indicative of a pressure of the refrigerant, operate the HVAC unit in a first operating mode or in a second operating mode based on the feedback, operate the first valve and open the second valve to enable refrigerant flow through the first condenser coil and the second condenser coil in the first operating mode, and operate the first valve and close the second valve to block refrigerant flow through the second condenser coil and enable refrigerant flow through the first condenser coil in the second operating mode.

DRAWINGS

Various aspects of this disclosure may be better understood upon reading the following detailed description and upon reference to the drawings in which.

DETAILED DESCRIPTION

Figure 1:
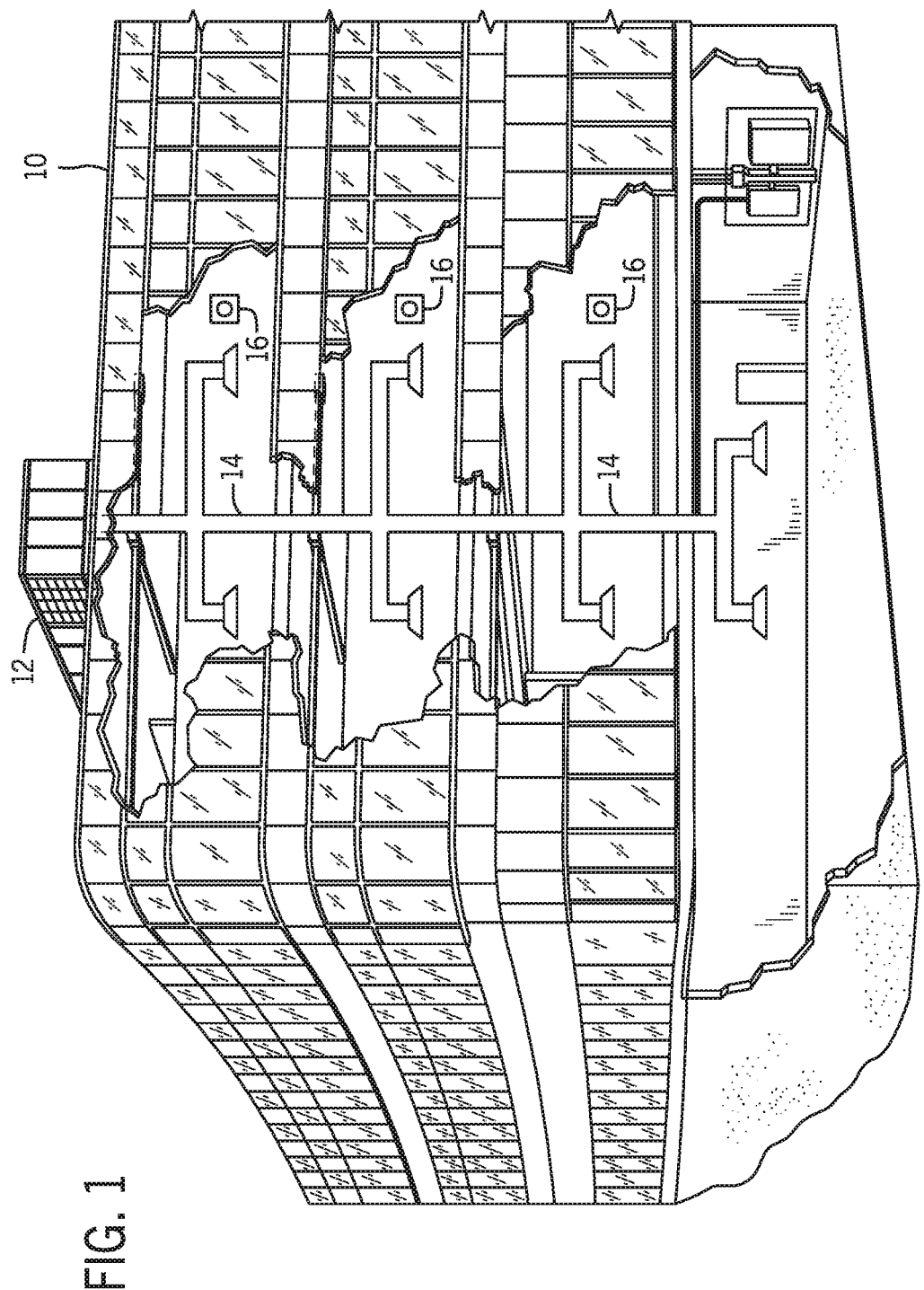
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system having reheat functionality. During a reheat mode, a vapor compression circuit of the HVAC system may be configured to direct pressurized refrigerant from a compressor to a condenser system and/or a reheat heat exchanger. In the condenser system, the refrigerant may be cooled, and the cooled refrigerant may be directed to an expansion valve that reduces a pressure of the refrigerant and further cools the refrigerant. The expansion valve may direct the refrigerant to an evaporator to enable heat transfer from the refrigerant to an air flow conditioned by the HVAC system in order to cool the air flow before the air flow is supplied to a space conditioned by the HVAC system. In the reheat heat exchanger, which is positioned downstream of the evaporator relative to a direction of the air flow, the refrigerant may exchange heat with the air flow conditioned by the HVAC system in order to heat the air flow and cool the refrigerant. Thereafter, the reheat heat exchanger may direct the cooled refrigerant to the expansion valve discussed above. The HVAC system may operate in the reheat mode to control a temperature and/or a humidity of the air flow supplied to the space, so as to deliver a more comfortable air flow. For example, the evaporator may first cool the air flow to remove a desirable amount of moisture from the air flow and dehumidify the air flow to a comfortable humidity, and the reheat heat exchanger may then heat the air flow up to a comfortable temperature.

In the reheat mode, the amount of reheat provided by the reheat heat exchanger may be controlled by controlling a flow rate of the refrigerant through the reheat heat exchanger relative to a flow rate of the refrigerant through the condenser system. Generally, the reheat heat exchanger may provide a greater capacity of heating by increasing the flow rate of refrigerant through the reheat heat exchanger. In some operating conditions, the pressure of the refrigerant in the condenser system may not be desirable. For example, the condenser system may excessively cool the refrigerant, which has a pressure proportional to its temperature. Reducing the temperature of the refrigerant in the condenser system, and thereby reducing the pressure of the refrigerant in the condenser system, may reduce the flow rate of the refrigerant from the condenser system to the expansion valve, and the refrigerant may thus not flow from the condenser system to the expansion valve at a desirable flow rate. Insufficient flow of the refrigerant to the expansion valve may affect a performance of the expansion valve and/or of the compressor, such as by reducing an amount of refrigerant available to be pressurized by the compressor. For this reason, a performance of the HVAC system, such as an efficiency of the HVAC system to condition the air flow, may be negatively impacted.

Thus, it is presently recognized that adjusting the amount of refrigerant cooling provided by the condenser system in the reheat mode may change the flow rate of the refrigerant from the condenser system to the expansion valve while enabling the HVAC system to provide sufficient reheat capabilities to condition the air flow. In particular, reducing the refrigerant cooling capacity of the condenser system may increase the flow rate of the refrigerant to the expansion valve in order to maintain a desirable performance of the HVAC system. Accordingly, in the embodiments disclosed herein, the condenser system may include two sections or coils that may be operated independently of one another. In one operating mode, the refrigerant may be directed through both coils of the condenser system such that both sections may be in operation to cool the refrigerant. As such, the condenser system provides full cooling capacity. In another operating mode, the refrigerant may be blocked from flowing through one of the coils such that the coil is inactive, while the other coil of the condenser system is in operation to cool the refrigerant. Thus, a single coil of the condenser is active, and the cooling capacity of the condenser system is reduced. As such, the pressure of the refrigerant in the condenser system may increase. As a result, the total performance of the HVAC system may be improved in certain conditions.

In some embodiments utilizing the present techniques, the condenser system may use single-speed fans to cool the refrigerant flowing through the coils of the condenser system. The operation of the single-speed fans may be controlled based on the coils of the condenser system that are active and have refrigerant flowing therethrough. For instance, operation of one of the fans may be suspended when a corresponding coil of the condenser system is inactive. Thus, energy consumption of the HVAC system may be reduced. Furthermore, by implementing single-speed fans instead of variable speed fans, a cost associated with the manufacture of the HVAC system may be reduced.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
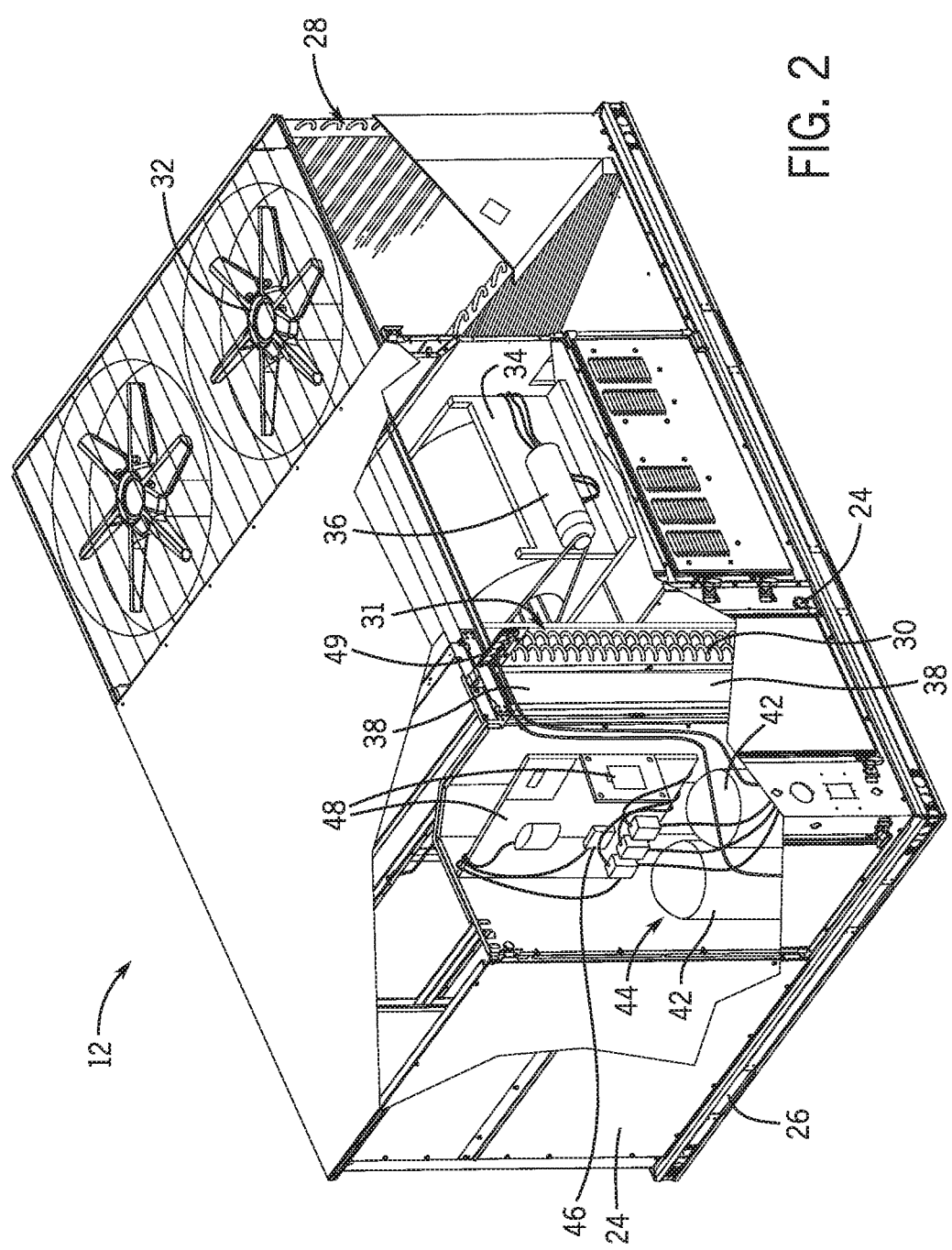
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
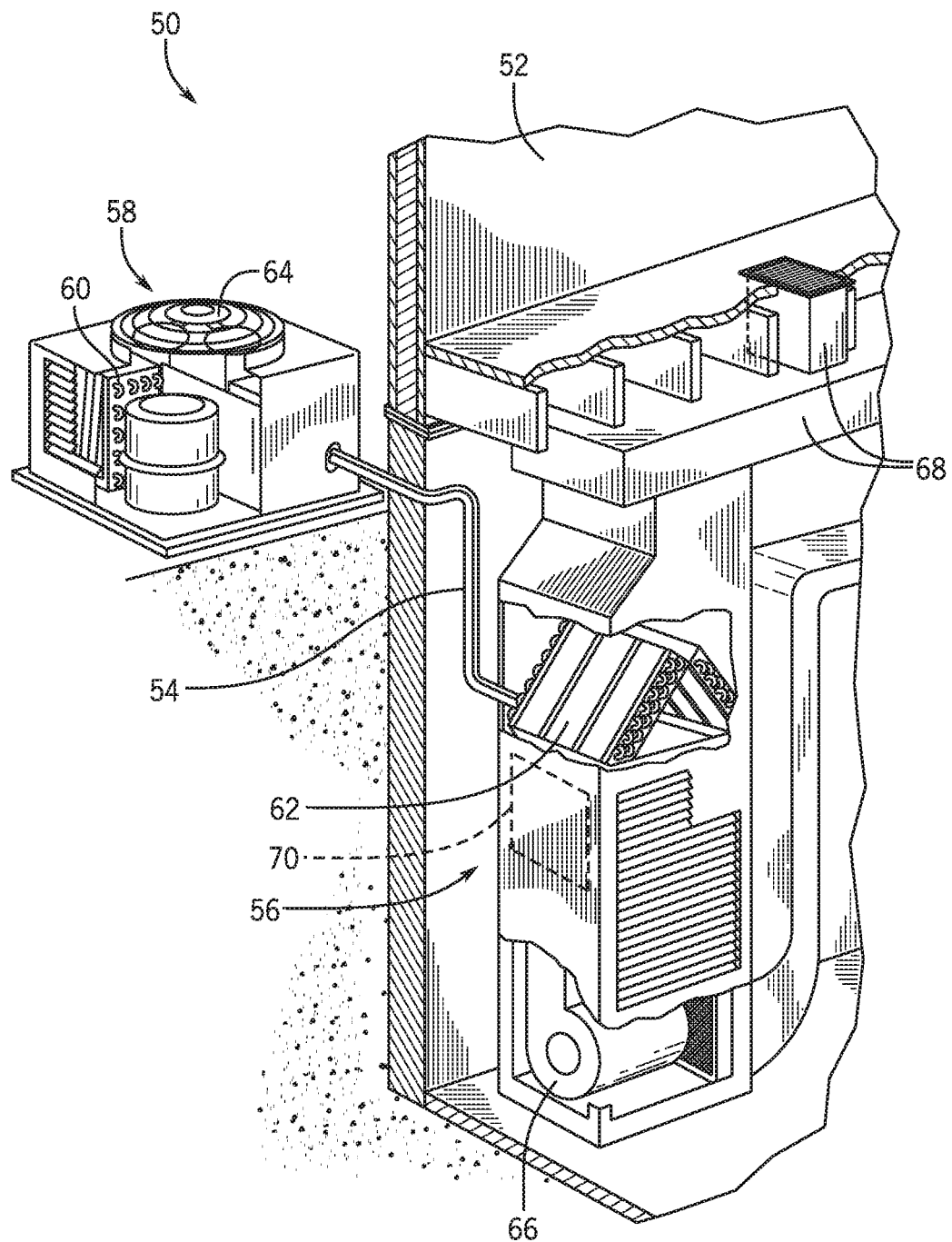
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
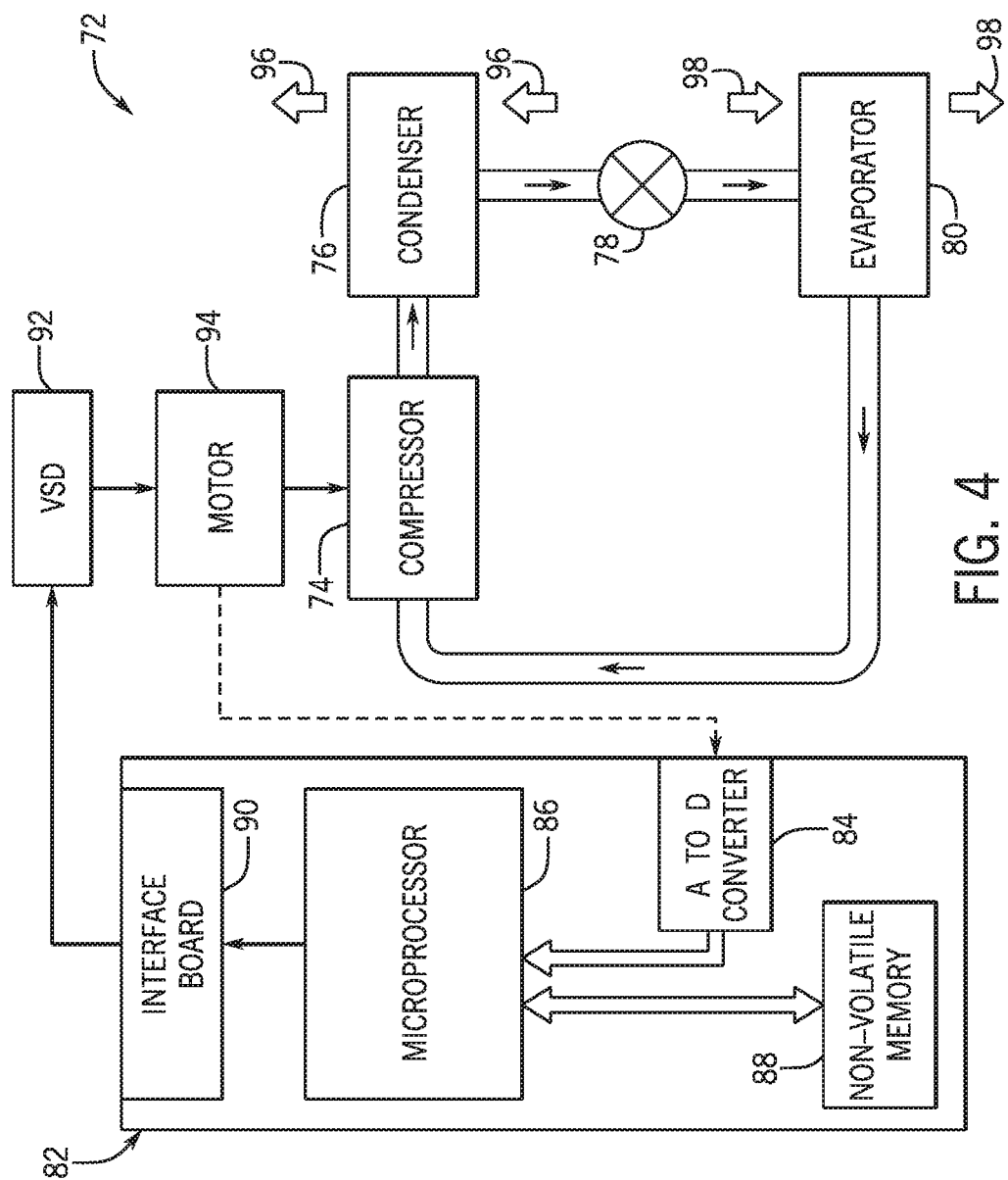
FIG. 4 is a schematic of an embodiment of a vapor compression system that can be used in any of the systems of FIGS. 1-3, in accordance with an aspect of the present disclosure, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system configured to control a pressure of refrigerant in the condenser system, and thus the HVAC system overall, by changing the operation of different coils of the condenser system. As an example, in a reheat mode, the HVAC system may be configured to cool an air flow via an evaporator to dehumidify the air flow to a desirable humidity, and the HVAC system may also be configured to reheat the air flow via a reheat heat exchanger to a desirable temperature. In other words, the HVAC system utilizes the evaporator to first dehumidify the air flow and then utilizes the reheat heat exchanger positioned downstream of the evaporator to subsequently reheat the air flow to a desired temperature. Thus, the HVAC system may condition the air flow to provide comfortable cooling of a space conditioned by the HVAC system.

During the reheat mode, a pressure of the refrigerant in the condenser system, which is configured to cool the refrigerant, may be reduced to a level below a desirable pressure. To increase the pressure of the refrigerant in the condenser system, the HVAC system may block the refrigerant from flowing through one of the coils of the condenser system, thereby reducing the refrigerant cooling provided by the condenser system and increasing the pressure of the refrigerant in the condenser system. The increased pressure of the refrigerant in the condenser system may enable the refrigerant to circulate through the HVAC system at a sufficient pressure, and therefore a sufficient flow rate, to maintain a desired performance of the HVAC system while conditioning the air flow.

Although the present disclosure primarily discusses selectively operating the coils of the condenser system during a reheat mode of the HVAC system, it should be noted that the coils of the condenser system may be selectively operated in other modes. For example, the refrigerant flow through the coils of the condenser system may be selectively controlled based on a low ambient operating mode, a low load operating mode, an operating mode of the compressor, another suitable operating mode, or any combination thereof. In other words, the operation of the condenser system may be controlled to adjust the pressure of the refrigerant in the condenser system and the HVAC system overall and/or to adjust the flow rate of the refrigerant toward the expansion valve in any suitable operating conditions of the HVAC system.

Figure 5:
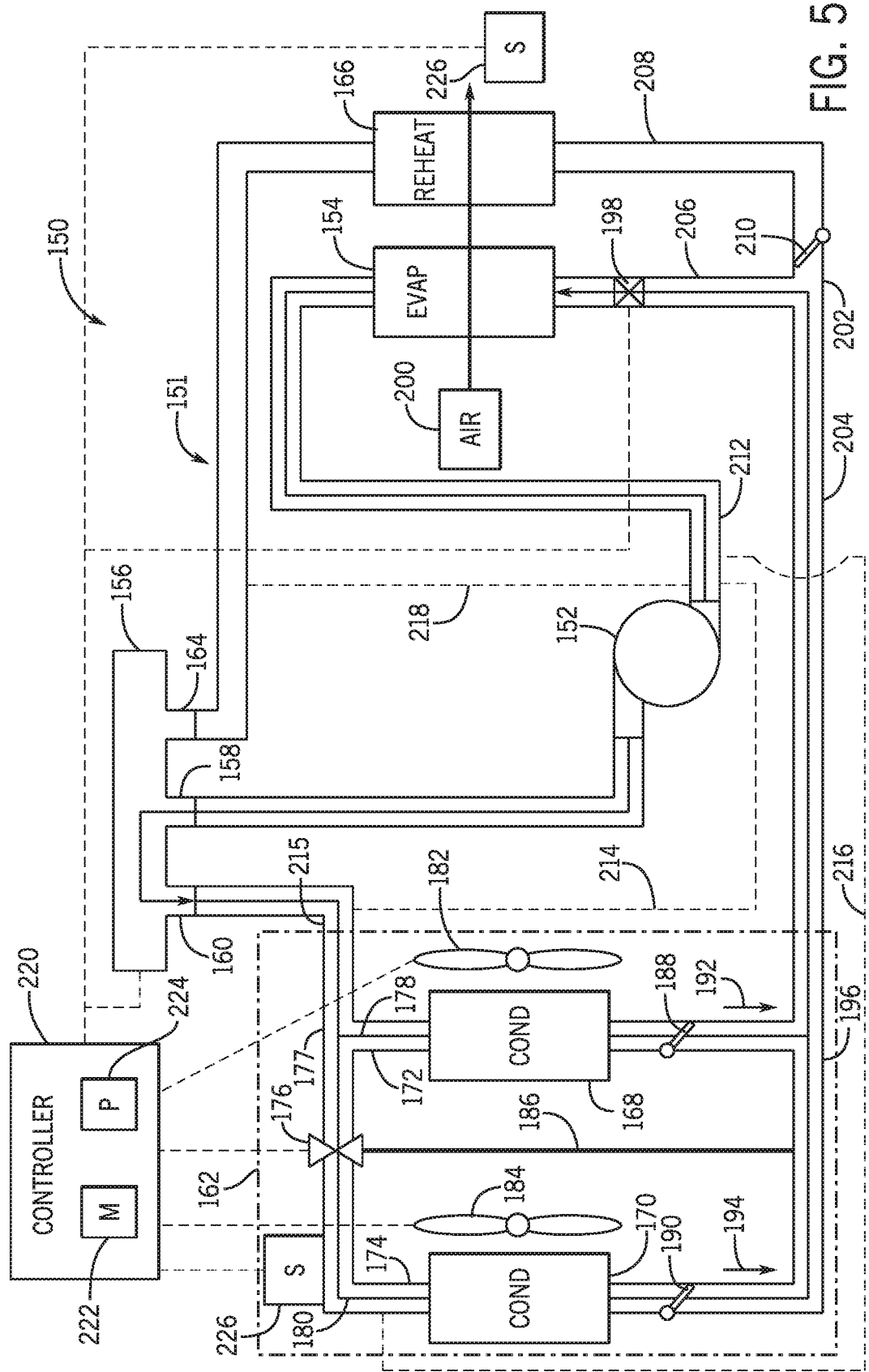
FIG. 5 is a schematic of an embodiment of an HVAC system having reheat functionality and operating in a first operating mode, in accordance with an aspect of the present disclosure.

With the foregoing in mind, FIG. 5 is a schematic view of an embodiment of an HVAC system 150 having reheat functionality. The HVAC system 150 may have a refrigerant circuit 151 configured to direct a refrigerant throughout the HVAC system 150. The refrigerant circuit 151 may include various tubing, piping, pumps, valves, and so forth that enable the refrigerant to flow through various components of the HVAC system 150. The HVAC system 150 may include a compressor 152 that is disposed along the refrigerant circuit 151 and is configured to receive refrigerant from an evaporator coil 154. The compressor 152 may pressurize the refrigerant, thereby increasing a temperature of the refrigerant, and may direct the pressurized refrigerant to a three-way valve 156 disposed along the refrigerant circuit 151. In some embodiments, the compressor 152 may be a variable speed and/or a variable stage compressor, and the compressor 152 may be configured to control the amount of pressurization of the refrigerant. The three-way valve 156 may include an inlet 158 configured to receive the pressurized refrigerant directed from the compressor 152, a first outlet 160 configured to direct the pressurized refrigerant toward a condenser system 162, which may be disposed in an ambient environment, and a second outlet 164 configured to direct the pressurized refrigerant toward a reheat coil 166 disposed along the refrigerant circuit 151. As used herein, the condenser system 162 may include any suitable components to cool the refrigerant received from the three-way valve 156, such as tubing, coils, slabs, and so forth. The three-way valve 156 may be configured to direct refrigerant flow from the inlet 158 to the first outlet 160, to the second outlet 164, or both, based on an operating mode of the HVAC system 150. For instance, the three-way valve 156 may include a component, such as a slider, that is adjustable within the three-way valve 156 and is configured to block or partially block refrigerant flow out of the first outlet 160 or the second outlet 164.

FIG. 5 illustrates the HVAC system 150 operating in a first operating mode, which may be a cooling mode or full cooling mode. In the cooling mode, the three-way valve 156 is configured to direct the pressurized refrigerant to flow from the inlet 158 to the first outlet 160, but not to the second outlet 164. In this manner, the refrigerant may flow from the three-way valve 156 to the condenser system 162, but not to the reheat coil 166. The condenser system 162 may be configured to cool the refrigerant. In the illustrated embodiment, the condenser system 162 includes a first condenser coil 168 and a second condenser coil 170 that are positioned in a parallel arrangement relative to respective refrigerant flows directed therethrough. That is, the first condenser coil 168 may be a first condenser having a first set of tubes, the second condenser coil 170 may be a second condenser having a second set of tubes, and the first set of tubes and second set of tubes are thermally and fluidly isolated from one another. For example, the condenser system 162 includes a first conduit 172 configured to direct the refrigerant flow from the three-way valve 156 through the first condenser coil 168. Additionally, the condenser system 162 includes a second conduit 174 configured to direct the refrigerant flow from the three-way valve 156 through the second condenser coil 170.

The condenser system 162 may also include a first valve 176 positioned within the condenser system 162 upstream of the second condenser coil 170 relative to a flow of refrigerant through the second condenser coil 170. The first valve 176 is not positioned upstream of the first condenser coil 168. More specifically, in the illustrated embodiment, the condenser system 162 includes a first junction 177, where the refrigerant may divide into a first portion 178 directed through the first conduit 172 and through the first condenser coil 168 and into a second portion 180 directed through the second conduit 174 and through the second condenser coil 170. The first valve 176 is positioned between the first junction 177 and the second conduit 174 and may be adjustable to change the amount of refrigerant directed to the second conduit 174 from the three-way valve 156. In this way, the first valve 176 may adjust the amount of refrigerant in the first portion 178 and in the second portion 180, thereby changing a flow rate of the refrigerant through the first condenser coil 168 and the second condenser coil 170. That is, a position of the first valve 176 may be adjusted to control an amount of refrigerant that may flow therethrough to the second conduit 174, and any refrigerant that does not flow through the first valve 176 to the second conduit 174 will instead flow to the first conduit 172.

In an embodiment, the first valve 176 may be solenoid valve, and the position of the first valve 176 may be based on an electrical signal. By way of example, the first valve 176 may be a normally open valve. In other words, the first valve 176 may be in an open position, which is the configuration shown in the first operating mode depicted in FIG. 5, if the first valve 176 does not receive an electrical signal from a controller or other source. In the open position of the first valve 176, the first valve 176 may enable refrigerant flow through the second condenser coil 170. Therefore, the first portion 178 of the refrigerant may flow through the first condenser coil 168, and the second portion 180 of the refrigerant may flow through the second condenser coil 170. In certain implementations, the first portion 178 may be substantially equal to the second portion 180 when the first valve 176 is in the open position. That is, the flow rate of refrigerant through the first condenser coil 168 may be approximately the same flow rate as the flow rate of refrigerant through the second condenser coil 170. Upon receipt of the electrical signal, the first valve 176 may be configured to adjust to a closed position, and the first valve 176 may therefore block refrigerant flow through the second condenser coil 170. Thus, substantially all of the refrigerant flowing from the three-way valve 156 will flow through the first condenser coil 168 as the first portion 178. In this configuration, the first condenser coil 168 is active and operates to cool the refrigerant, and the second condenser coil 170 is inactive and does not cool the refrigerant. Thus, the amount of cooling provided by the condenser system 162 may be reduced when the first valve 176 is in the closed position. Additionally or alternatively, the first valve 176 may be set to an intermediate position upon receipt of another electrical signal. The intermediate position of the first valve 176 may enable the refrigerant to flow through the condenser coil 170 at a particular flow rate, such as at a reduced flow rate that is lower than the flow rate of the refrigerant through the first condenser coil 168.

Although a single first valve 176 is implemented in the illustrated embodiment to control refrigerant flow to the second condenser coil 170, in additional or alternative embodiments, a different arrangement of valves may be used to control refrigerant flow through the condenser system 162. For example, a valve may be positioned in the first conduit 172 to enable or restrict refrigerant flow through the first condenser coil 168 and another valve may be positioned in the second conduit 174 to enable or restrict refrigerant flow through the second condenser coil 170. The valve and the additional valve may be independently controllable such that the refrigerant flow through the first condenser coil 168 and the second condenser coil 170 may be more acutely regulated.

Although the condenser system 162 includes two condenser coils 168, 170 in the illustrated embodiment, in additional or alternative embodiments, the condenser system 162 may include any number of coils and corresponding components to enable refrigerant to flow through portions of the condenser system 162 independently of one another. For instance, the condenser system 162 may include three condenser coils, four condenser coils, or five or more condenser coils. The refrigerant flow through each of the condenser coils may be controlled to enable the condenser system 162 to provide a desirable amount of cooling of the refrigerant.

In certain embodiments, the condenser system 162 may include a first fan 182 configured to draw or force air across the first condenser coil 168, thereby removing heat from the refrigerant flowing through the first condenser coil 168 via convection and cooling the refrigerant. Additionally or alternatively, the condenser system 162 may include a second fan 184 configured to draw or force air across the second condenser coil 170 to cool the refrigerant flowing through the second condenser coil 170. In some embodiments, the first fan 182 may be configured to direct air across the first condenser coil 168, but not the second condenser coil 170, and the second fan 184 may be configured to direct across the second condenser coil 170, but not the first condenser coil 168. As an example, the first condenser coil 168 may be disposed within a first volume of the condenser system 162, the second condenser coil 170 may be disposed within a second volume of the condenser system 162, and the condenser system 162 may include a divider or partition 186 that blocks air from flowing between the first volume and the second volume. In additional or alternative embodiments, the first fan 182 may direct air across both the first condenser coil 168 and the second condenser coil 170, and the second fan 184 may direct air across both the first condenser coil 168 and the second condenser coil 170. Thus, the first fan 182 and the second fan 184 cooperatively direct the air flow through the condenser system 162 at a full flow rate when in operation.

It should be noted that the first fan 182 and/or the second fan 184 may be single speed fans, rather than variable speed fans, to reduce a cost associated with manufacture of the HVAC system 150. As such, when in operation, the fans 182, 184 may be configured to rotate at a set rotational speed, and the rotational speed of the fans 182, 184 may not be changed from the set rotational speed. In additional or alternative embodiments, the first fan 182 and/or the second fan 184 may be variable speed fans to increase control for directing air across the condensers 168, 170. The fans 182, 184 may also be independently controllable relative to one another. In an example, in embodiments having the divider 186, if the first valve 176 blocks refrigerant flow from the three-way valve 156 to the second condenser coil 170, power supplied to the second fan 184 may be interrupted to suspend the operation of the second fan 184 and reduce a consumption of energy. However, the first fan 182 may continue to operate. In another example, such as embodiments that do not have the divider 186 and where each fan 182, 184 is configured to direct air across both condenser coil 168, 170, power supplied to one of the fans 182, 184 may be interrupted to suspend operation of one of the fans 182, 184 if less cooling is desired. Thus, the operation of the fans 182, 184 may be selectively operated to enable greater control of the cooling of the refrigerant flowing through the condenser system 162.

In some implementations, the first conduit 172 and the second conduit 174 may include a second valve 188 and a third valve 190, respectively. The second valve 188 is positioned along the refrigerant circuit 151 downstream of the first condenser coil 168. The second valve 188 may enable refrigerant to flow from the first condenser coil 168 toward the evaporator coil 154 and may block backflow of refrigerant, such as restricting refrigerant flow exiting the second condenser coil 170 and flowing toward the first condenser coil 168. Thus, the second valve 188 enables the refrigerant to flow from the first condenser coil 168 out of the condenser system 162 in a first flow direction 192. Similarly, the third valve 190, which is positioned along the refrigerant circuit 151 downstream of the second condenser coil 170, may enable refrigerant to flow from the second condenser coil 170 toward the evaporator coil 154 and may block backflow of the refrigerant, such as restricting refrigerant flow exiting the first condenser coil 168 and flowing toward the second condenser coil 170. As such, the third valve 190 may enable refrigerant to flow from the second condenser coil 170 out of the condenser system 162 in a second flow direction 194. By way of example, the second valve 188 and/or the third valve 190 may each be a check valve. In the illustrated embodiment, the condenser system 162 includes a second junction 196 where the first portion 178 of the refrigerant exiting the first condenser coil 168 and the second portion 180 of the refrigerant exiting the second condenser coil 170 combine with one another. The combined first portion 178 and second portion 180 of the refrigerant may then flow out of the condenser system 162 and toward the evaporator coil 154 along the refrigerant circuit 151.

The HVAC system 150 may additionally include an expansion valve 198 disposed along the refrigerant circuit 151 and configured to reduce a pressure of the refrigerant flowing toward the evaporator coil 154. To this end, the expansion valve 198 is positioned upstream of the evaporator coil 154. By reducing the pressure of the refrigerant, the expansion valve 198 may cool the refrigerant. The cooled refrigerant then flows through the evaporator coil 154. The evaporator coil 154 may place the cooled refrigerant in a heat exchange relationship with an air flow 200 that is first directed across the evaporator coil 154 and is then directed across the reheat coil 166 before being delivered to a space serviced by the HVAC system 150. After the refrigerant absorbs heat with the air flow 200, the evaporator coil 154 directs the refrigerant back to the compressor 152 via the refrigerant circuit 151. As mentioned, in the first operating mode, heat may transfer from the air flow 200 to the refrigerant flowing through the evaporator coil 154, thereby cooling the air flow 200. However, substantially no heat may be exchanged with the air flow 200 via the reheat coil 166 in the first operating mode, because no refrigerant flows through the reheat coil 166 in the first operating mode. As such, the temperature of the air flow 200 directed toward the space serviced by the HVAC system 150 may be substantially the same as the temperature of the air flow 200 leaving the evaporator coil 154.

The refrigerant circuit 151 may include a third junction 202 connecting a liquid line 204, an evaporator line 206, and a reheat line 208. The liquid line 204 directs refrigerant from the condenser system 162 to the third junction 202, the evaporator line 206 directs refrigerant from the third junction 202 to the expansion valve 198 and the evaporator coil 154, and the reheat line 208 directs refrigerant from the third junction 202 to the reheat coil 166. To block refrigerant from flowing toward the reheat coil 166 from the third junction 202, the refrigerant circuit 151 may include a fourth valve 210. For instance, the fourth valve 210 may be check valve. In the first operating mode of the HVAC system 150, the fourth valve 210 and the three-way valve 156 may block refrigerant flow through the reheat line 208 and the reheat coil 166.

In the illustrated implementation, the HVAC system 150 includes various drain lines to enable some flow of refrigerant from various sections of the refrigerant circuit 151 toward the compressor 152, such as to a suction line 212. For example, a first drain line 214 may direct refrigerant from a condenser line 215 to the suction line 212. Further, a second drain line 216 may direct refrigerant from the second conduit 174 to the suction line 212, and a third drain line 218 may direct refrigerant from the reheat line 208 to the suction line 212. Thus, the drain lines 214, 216, 218 may increase the amount of refrigerant that is flowing to the compressor 152 to condition the air flow 200. Particularly, the first drain line 214 may enable any residual refrigerant to be recovered from proximate the condenser system 162, such as when the first outlet 160 is blocked and no refrigerant is directed from the three-way valve 156 to the condenser system 162. The second drain line 216 may enable any residual refrigerant to be recovered from the second conduit 174, such as when the first valve 176 blocks refrigerant from flowing through the second condenser coil 170. As such, the drain lines 214, 216 enable refrigerant that is located upstream of the The third drain line 218 may enable residual refrigerant to be recovered from the reheat line 208, such as when the second outlet 164 of the three-way valve 156 is blocked and no refrigerant is directed toward the reheat coil 166. In this manner, trapped refrigerant within various, non-operational sections of the refrigerant circuit 151 may be mitigated. In additional or alternative implementations, the drain lines 214, 216, 218 may be positioned in a different manner and/or additional drain lines may be implemented to enable refrigerant to flow toward the compressor 152. For example, the drain lines 214, 216 may enable refrigerant exiting the first and second condenser coils 168, 170 to flow toward the suction line 212.

In some implementations, the HVAC system 150 may include a controller 220 configured to control the operation of the HVAC system 150, such as to change the operating mode of the HVAC system 150. The controller 220 may include a memory 222 and a processor 224. The memory 222 may include volatile memory, such as random-access memory (RAM), and/or non-volatile memory, such as read-only memory (ROM), optical drives, hard disc drives, solid-state drives, or any other non-transitory computer-readable medium that includes instructions to operate the HVAC system 150. The processor 224 may be configured to execute such instructions, such as to control operation of certain components of the HVAC system 150, including the three-way valve 156, the first valve 176, the first fan 182, the second fan 184, the expansion valve 198, and so forth. For example, the processor 224 may include one or more application specific integrated circuits (ASICs), one or more field programmable gate arrays (FPGAs), one or more general purpose processors, or any combination thereof.

The controller 220 may be communicatively coupled to a set of sensors 226 configured to transmit feedback to the controller 220 indicative of various operating parameters or conditions of the HVAC system 150. The controller 220 may be configured to operate the HVAC system 150 based on the feedback received from the sensor(s) 226. In some embodiments, the sensor(s) 226 may be configured to determine an ambient temperature and/or a temperature of the space conditioned by the HVAC system 150. Based on a determined temperature, the controller 220 may operate the HVAC system 150 accordingly. By way of example, if the controller 220 receives feedback indicative of the ambient temperature exceeding a threshold temperature and/or feedback indicative of the temperature of the space exceeding a target temperature, such as a desired temperature or setpoint input by a user via a thermostat, the controller 220 may operate the HVAC system 150 in the first operating mode to cool the space. In response, the controller 220 may adjust the three-way valve 156 to block the refrigerant from flowing out of the second outlet 164 to the reheat coil 166, and the controller 220 may adjust the first valve 176 to enable the refrigerant to flow through the second condenser coil 170.

Figure 6:
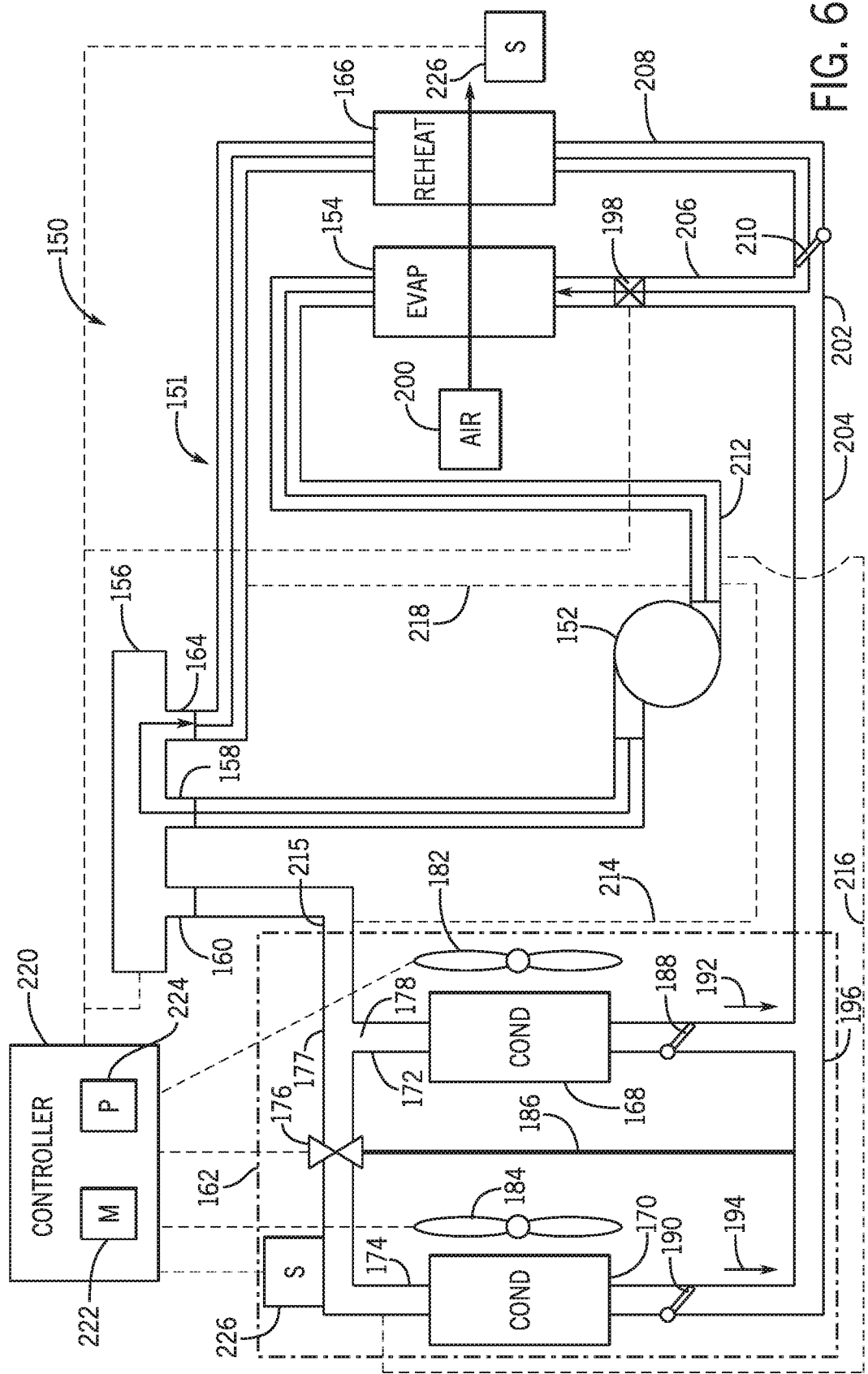
FIG. 6 is a schematic of the HVAC system of FIG. 5 operating in a second operating mode, in accordance with an aspect of the present disclosure.

FIG. 6 is a schematic of the HVAC system 150 of FIG. 5 in a second operating mode, which may be a reheat or full reheat mode. In the second operating mode, the three-way valve 156 may be configured to block the refrigerant from flowing through the first outlet 160 and toward the condenser system 162 and to enable the refrigerant to flow through the second outlet 164 and toward the reheat coil 166. Therefore, substantially all of the refrigerant that is pressurized and heated by the compressor 152 may be directed to the reheat coil 166 in order to reheat the air flow 200 exiting the evaporator coil 154. Thereafter, the refrigerant may be directed from the reheat coil 166 to the expansion valve 198 to be expanded and cooled.

In the reheat mode, the evaporator coil 154 may place the refrigerant in a heat exchange relationship with the air flow 200 to cool the air flow 200 and heat the refrigerant before the reheat coil 166 reheats the air flow 200, as discussed above. For instance, the HVAC system 150 may be configured to operate in the second operating mode to control a humidity of or an amount of moisture within the air flow 200. That is, the evaporator coil 154 may cool the air flow 200 to condense and remove an amount of moisture in the air flow 200. However, during this dehumidification process, the evaporator coil 154 may reduce the temperature of the air flow 200 below a desirable or comfortable temperature. For this reason, the reheat coil 166 may increase the temperature of the air flow 200 to a comfortable temperature to be delivered to the space after the air flow 200 leaves the evaporator coil 154. In this way, the humidity and the temperature of the air flow 200 provided to the space may be at comfortable levels for conditioning the space.

In some implementations, the controller 220 may be configured to operate the HVAC system 150 in the second operating mode upon receiving feedback from the sensor(s) 226 indicative that a humidity of the air flow 200, of the ambient environment, and/or of the space conditioned by the HVAC system 150 exceeds a humidity threshold. Thus, the controller 220 may operate the HVAC system 150 in the second operating mode in order to reduce the humidity of the space conditioned by the HVAC system 150.

Figure 7:
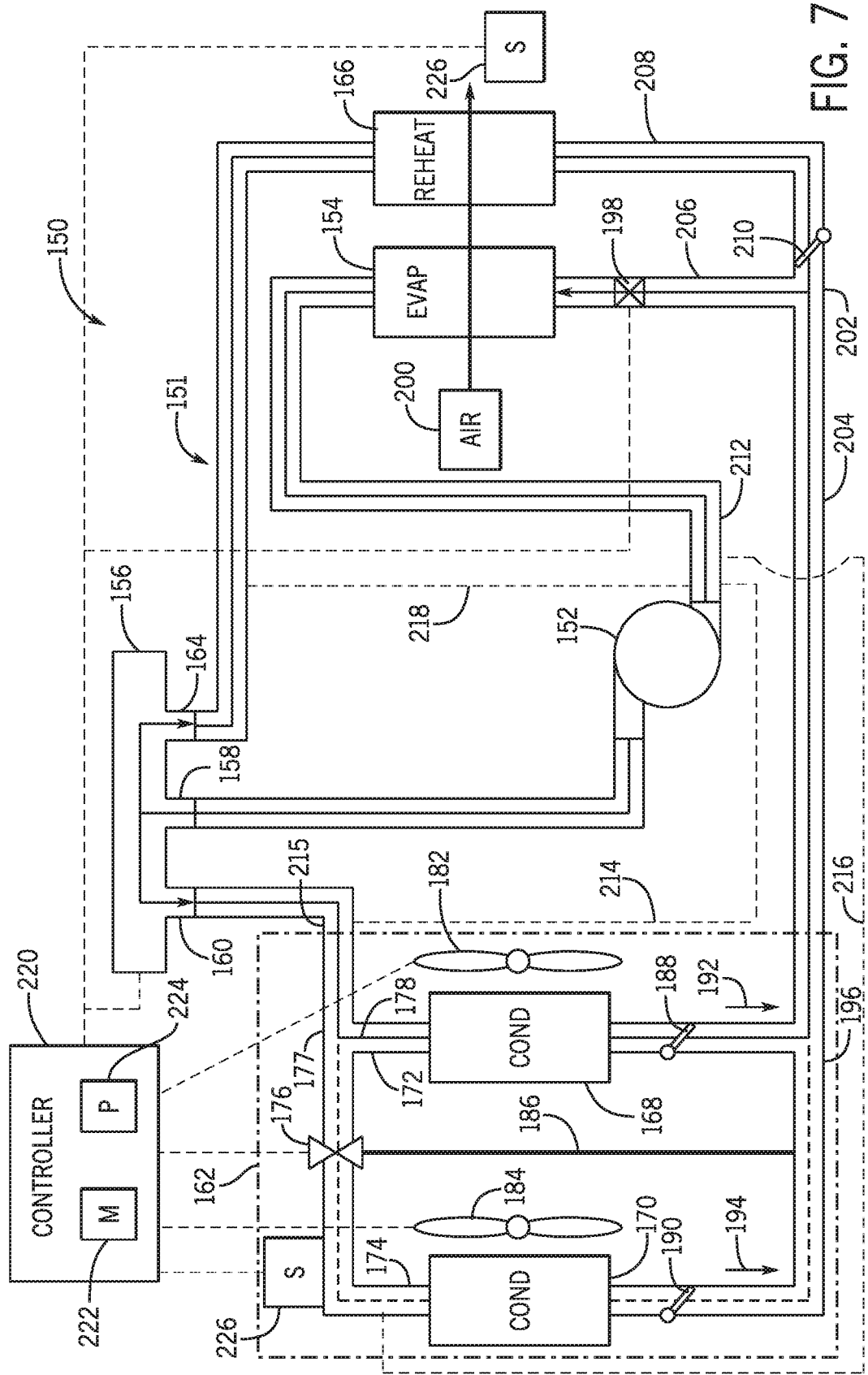
FIG. 7 is a schematic of the HVAC system of FIGS. 5 and 6 operating in a third operating mode, in accordance with an aspect of the present disclosure.

FIG. 7 is a schematic of the HVAC system 150 of FIGS. 5 and 6 in a third operating mode, which may be a modulating reheat mode. As used herein, the modulating reheat mode refers to a reheat mode in which the reheat coil 166 provides less heating to the air flow 200 relative to an amount of heating provided to the air flow 200 by the reheat coil 166 in the second or full reheat operating mode. For instance, in the third operating mode, the three-way valve 156 may be configured to enable some of the refrigerant to flow through the first outlet 160 toward the condenser system 162 and a remainder of the refrigerant to flow through the second outlet 164 toward the reheat coil 166. In certain implementations, the reheat coil 166 may be configured to receive 10 percent to 90 percent of a total amount of refrigerant directed from the compressor 152 to the three-way valve 156. The third operating mode may enable the HVAC system 150 to control the amount of heating provided by the reheat coil 166. For instance, the three-way valve 156 may control a flow rate of heated refrigerant directed to the reheat coil 166 relative to a flow rate of heated refrigerant directed to the condenser system 162. Increasing the flow rate of heated refrigerant directed to the reheat coil 166, and therefore reducing the flow rate of heated refrigerant directed to the condenser system 162, may increase the amount of heating provided by the reheat coil 166 to the air flow 200. Conversely, reducing the flow rate of heated refrigerant directed to the reheat coil 166, and therefore increasing the flow rate of heated refrigerant directed to the condenser system 162, may reduce the amount of heating provided by the reheat coil 166 to the air flow 200. By controlling the amount of heating provided by the reheat coil 166, the HVAC system 150 may more acutely control the temperature and/or the humidity of the air flow 200 provided to the space.

In some instances, reducing the flow rate of heated refrigerant directed to the condenser system 162 may affect a performance of the HVAC system 150 during conditioning of the air flow 200. For example, reducing the ratio of the flow rate of refrigerant directed to the condenser system 162 relative to the flow rate of refrigerant directed to the reheat coil 166 below 25 percent may reduce the pressure of the refrigerant in the condenser system 162 below a desirable level. The reduced pressure of the refrigerant in the condenser system 162 and/or in the refrigerant circuit 151 may affect the performance of the expansion valve 198 and/or the compressor 152, thereby impacting an efficiency of the HVAC system 150 when conditioning the air flow 200.

For this reason, the controller 220 may be configured to adjust the first valve 176 to control the flow rate of refrigerant directed through the second condenser coil 170. As an example, the controller 220 may be configured to transmit the electrical signal to the first valve 176 to adjust the first valve 176 to the closed position so as to block refrigerant from flowing through the second condenser coil 170. As a result, the second condenser coil 170 is inactive, and the amount of cooling provided by the condenser system 162 is reduced. By reducing the amount of cooling of the refrigerant flowing through the condenser system 162, the pressure of the refrigerant within the condenser system 162 may increase, thereby maintaining the pressure of the refrigerant at or above a desirable level and thus improving operation of HVAC system 150 components and improving the efficiency of the HVAC system 150.

In some embodiments, the controller 220 may be configured to output the electrical signal to close the first valve 176 based on feedback received from the sensor(s) 226. In an example, the feedback may be indicative of a pressure level of the refrigerant, such as a head pressure of the refrigerant discharged by the compressor 152, a pressure of the refrigerant in the condenser system 162, a pressure of the refrigerant in the liquid line 204, and/or a pressure of the refrigerant in another suitable section within the refrigerant circuit 151. When the controller 220 receives feedback indicative that the refrigerant pressure is below a pressure threshold, the controller 220 may output the electrical signal to close the first valve 176 so as to increase the pressure of the refrigerant determined by the sensor(s) 226 in the manner described above. In another example, the feedback may be indicative of the ambient temperature. When the ambient temperature is below a temperature threshold, which may indicate that the ambient air may cause excessive cooling of the refrigerant in the condenser system 162, the controller 220 may also be configured to output the electrical signal to close the first valve 176 so as to increase the pressure of the refrigerant in the condenser system 162 in the manner described above. In a further example, the feedback may be indicative of any other suitable operating parameter, such as a temperature and/or a flow rate of the refrigerant at any suitable location along the refrigerant circuit 151.

Figure 8:
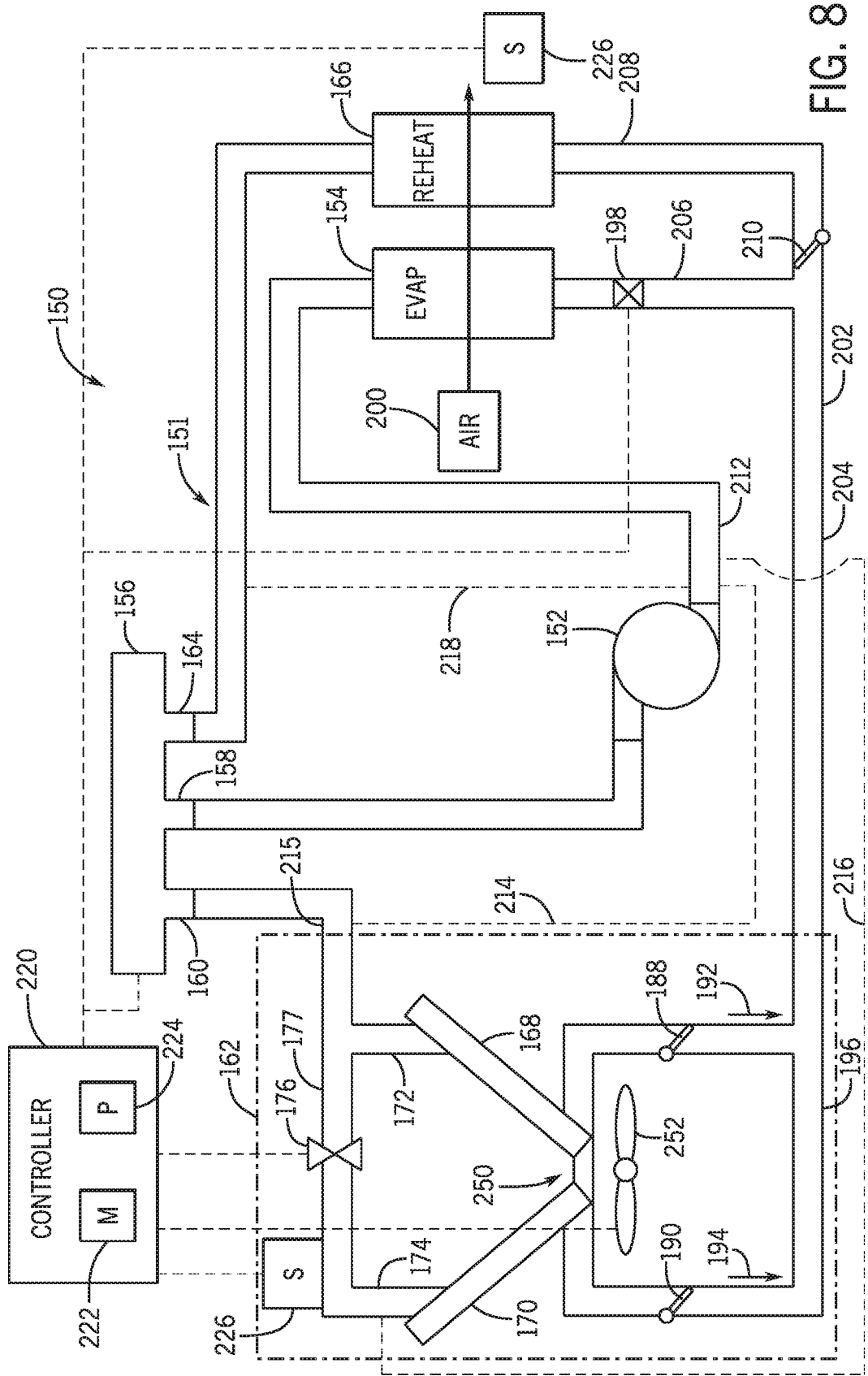
FIG. 8 is a schematic of an embodiment of an HVAC system having a condenser system with a single heat exchanger configured to cool refrigerant flowing through the condenser system, in accordance with an aspect of the present disclosure.

FIG. 8 is a schematic of an embodiment of the HVAC system 150, in which the condenser system 162 includes a single heat exchanger 250 configured to cool the refrigerant flowing through the condenser system 162. In the illustrated embodiment, the first condenser coil 168 may be a first slab of the heat exchanger 250, and the second condenser coil 170 may be a second slab of the heat exchanger 250. That is, the first condenser coil 168 may be a first set of tubes of the heat exchanger 250 through which the refrigerant may flow, and the second condenser coil 170 may be a second set of tubes of the heat exchanger 250 through which the refrigerant may flow. As illustrated in FIG. 8, the slabs may be oriented in a V-shape configuration, but in alternative embodiments, the slabs may be oriented in any suitable manner relative to one another.

The first slab and the second slab may be fluidly separate from one another. To this end, the first conduit 172 may direct refrigerant to the first slab of the heat exchanger 250 and through the first condenser coil 168, and the second conduit 174 may direct refrigerant to the second slab of the heat exchanger 250 and through the second condenser coil 170. Moreover, the first valve 176 may be configured to control the amount of refrigerant flowing to the second slab of the heat exchanger 250, thereby controlling the amount of refrigerant flowing through the second condenser coil 170. For example, the controller 220 may output the electrical signal to close the first valve 176 and block refrigerant flow to the second condenser coil 170. As such, the second condenser coil 170 may be inactive and substantially all of the refrigerant may flow from the three-way valve 156 to the first slab of the heat exchanger 250 and through the first condenser coil 168.

In certain embodiments, the condenser system 162 includes a fan 252 configured to force or draw air across multiple slabs of the heat exchanger 250, such as across both the first condenser coil 168 and the second condenser coil 170. When the heat exchanger 250 is in operation, such as when refrigerant is directed through the first condenser coil 168, the second condenser coil 170, or both, the controller 220 may operate the fan 252. In additional or alternative embodiments, the condenser system 162 may include separate fans configured to direct a respective air flow across the first condenser coil 168 and the second condenser coil 170. The controller 220 may be configured to control the fans independently of one another, thereby enabling separate cooling of the first condenser coil 168 and the second condenser coil 170 via the fans. In such embodiments, the controller 220 may interrupt a supply of power to one of the fans, thereby suspending operation of one of the fans, in response to determining that a corresponding slab is not in operation and actively flowing refrigerant so as to reduce a power consumption of the HVAC system 150.

Figure 9:
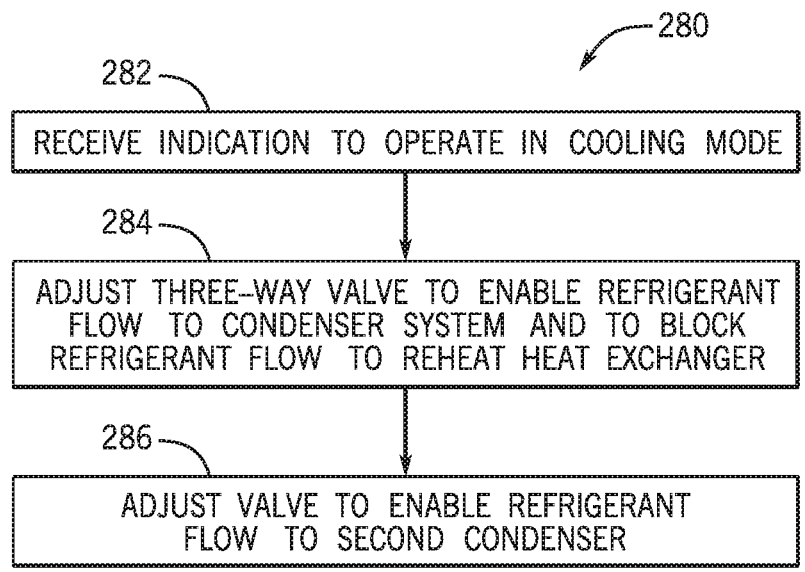
FIG. 9 is a block diagram of an embodiment of a method or process for operating an HVAC system in a first operating mode, in accordance with an aspect of the present disclosure.
Figure 10:
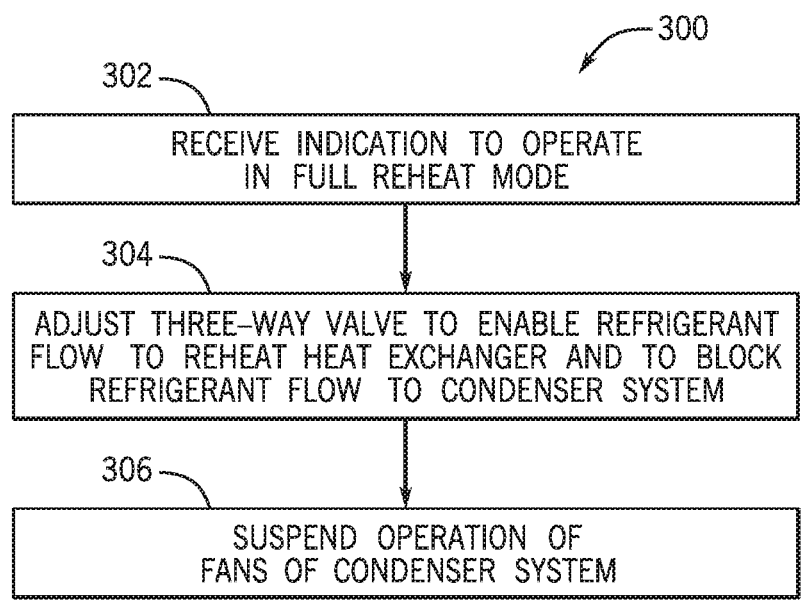
FIG. 10 is a block diagram of a method or process for operating an HVAC system in a second operating mode, in accordance with an aspect of the present disclosure.
Figure 11:
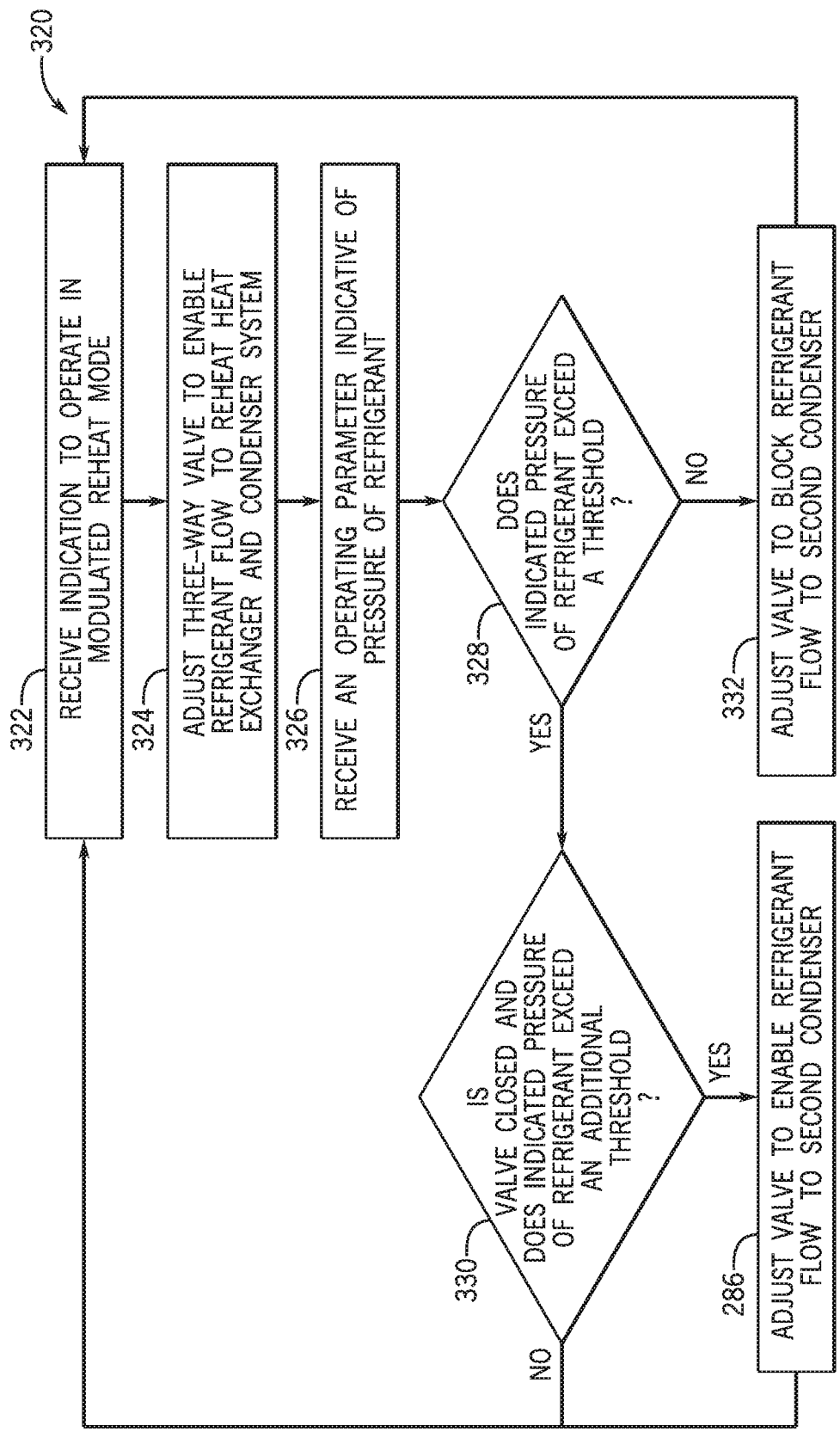
FIG. 11 is a block diagram of an embodiment of a method or process for operating the HVAC system in a third operating mode, in accordance with an aspect of the present disclosure.

FIGS. 9-11 each illustrate a method or process of operating the HVAC system 150. Each method may be performed by a controller, such as the controller 220. It should be noted that each method may be performed differently than depicted in FIGS. 9-11, such as for different embodiments of the HVAC system 150. By way of example, further steps may be performed in each method, and/or certain steps in the depicted method may be removed, modified, and/or performed in a different order.

FIG. 9 is a block diagram of an embodiment of a method or process 280 for operating the HVAC system 150 in the first operating mode or the cooling mode. At block 282, an indication is received to operate in the first operating mode. The indication may be received from a user input, such as a user input indicative of a desired temperature of the space conditioned by the HVAC system 150 or a desire for the HVAC system 150 to provide air flow 200 at a cooled temperature. Additionally or alternatively, the indication may be based on feedback received from the sensor(s) 226, and the feedback may indicate that the space is to be cooled by the HVAC system 150. For example, the feedback may indicate a temperature of the space is above a temperature threshold, an ambient temperature exceeds a temperature threshold, and so forth.

At block 284, the three-way valve 256 is adjusted to enable refrigerant flow to the condenser system 162 and to block refrigerant flow to the reheat coil 166. That is, the three-way valve 256 is adjusted to enable the refrigerant to flow out of the first outlet 160 and to block the refrigerant from flowing out of the second outlet 164. Thus, substantially all of the refrigerant pressurized and heated by the compressor 152 is directed toward the condenser system 162 in which the refrigerant is cooled.

At block 286, the first valve 176 is adjusted to enable refrigerant flow to the second condenser coil 170. By enabling refrigerant flow to the second condenser coil 170, the condenser system 162 may operate at full capacity to cool the refrigerant. In other words, both the first condenser coil 168 and the second condenser coil 170 may receive the first portion 178 and the second portion 180 of the refrigerant, respectively, and each fan 182, 184, 252 may be in operation to cool the refrigerant flowing through both condenser coils 168, 170. Thus, the first condenser coil 168 and the second condenser coil 170 are both active to cool the refrigerant, thereby enabling a greater amount of heat removal from the refrigerant.

In additional or alternative embodiments, if less cooling of the air flow 200 is desirable, the first valve 176 may be adjusted to block the refrigerant from flowing through the second condenser coil 170. In this way, the second condenser coil 170 is inactive, and operation of the second fan 184 may be suspended to reduce the amount of energy consumed by the HVAC system 150. As a result, refrigerant cooling may be provided by the first condenser coil 168 and not the second condenser coil 170, thereby reducing an overall amount of refrigerant cooling provided by the condenser system 162.

FIG. 10 is a block diagram of a method or process 300 for operating the HVAC system 150 in the second operating mode or the full reheat mode. At block 302, an indication is received to operate in the second operating mode. The indication may be received from another user input, such as a user input indicative of a desired humidity of the space conditioned by the HVAC system 150. Additionally or alternatively, the indication may be based on feedback received from the sensor(s) 226, such as feedback indicating the space is to be dehumidified by the HVAC system 150. Such feedback may indicate that a humidity of the space exceeds a humidity threshold, a humidity of the air flow 200 exceeds a humidity threshold, a humidity of an ambient air flow exceeds a humidity threshold, and the like.

At block 304, the three-way valve 156 is adjusted to enable refrigerant flow to the reheat coil 166 and to block refrigerant from flowing to the condenser system 162. As such, the three-way valve 156 enables the refrigerant to flow out of the second outlet 164 and blocks the refrigerant from flowing out of the first outlet 160. Thus, substantially all of the refrigerant pressurized and heated by the compressor 152 flows to the reheat coil 166. In this manner, the air flow 200 may first be cooled by refrigerant flowing through the evaporator coil 154 and then may be reheated by refrigerant flowing through reheat coil 166.

At block 306, the operation of the fan(s) of the condenser system 162, such as of the first fan 182, the second fan 184, and/or the fan 252, may be suspended by interrupting a power supply to the first fan 182, the second fan 184, and/or the fan 252. With substantially no refrigerant flowing through the condenser system 162, the fans 182, 184, 252 of the condenser system 162 do not have to be in operation to cool the refrigerant. As such, each of the fans 182, 184, 252 may not be powered so as to reduce energy consumption of the HVAC system 150 in the second operating mode.

FIG. 11 is a block diagram of an embodiment of a method or process 320 for operating the HVAC system 150 in the third operating mode or the modulating reheat mode. At block 322, an indication is received to operate in the third operating mode. By way of example, HVAC system 150 may operate in the third operating mode to reduce the amount of heating provided to the air flow 200 by the reheat coil 166 than that provided in the second operating mode. In other words, the third operating mode may be used to control the amount that the reheat coil 166 heats the air flow 200 more acutely. Thus, the third operating mode may be used to control the humidity and/or the temperature of the air flow 200 provided to the space conditioned by the HVAC system 150 more acutely.

At block 324, the three-way valve 156 is adjusted to enable refrigerant to flow to both the reheat coil 166 and to the condenser system 162. In this manner, the three-way valve 156 enables the refrigerant to flow out of the first outlet 160 and out of the second outlet 164. In some implementations, respective amounts of refrigerant that flow out of the first outlet 160 and out of the second outlet 164 may be controllable. That is, the three-way valve 156 may be set to a particular position that enables particular flow rates of refrigerant to the reheat coil 166 and to the condenser system 162.

At block 326, an operating parameter indicative of a pressure of the refrigerant is received. The operating parameter may be feedback transmitted from the sensor(s) 226 and may include a direct reading of the pressure of the refrigerant, such as a pressure of the refrigerant in the condenser system 162, in the liquid line 204, discharged by the compressor 152, and the like. Additionally or alternatively, the operating parameter may be indirectly related to the pressure of the refrigerant, such as an ambient temperature, a temperature of the refrigerant, a flow rate of the refrigerant, another suitable operating parameter, or any combination thereof.

At block 328, the detected pressure of the refrigerant is compared to a pressure threshold, which may be a fire pressure threshold that is a value indicative of an operation of the HVAC system 150 below a desired efficiency or performance level. In other words, it may be desirable to maintain the pressure of the refrigerant above the first pressure threshold in order to maintain a desired performance of the HVAC system 150. Thus, the operating parameter may be monitored to determine whether the HVAC system 150 is operating desirably.

If the pressure of the refrigerant exceeds the first pressure threshold while the first valve 176 is closed, a determination may be made as to whether the pressure of the refrigerant exceeds an additional or second pressure threshold, as indicated at block 330. If the first valve 176 is not closed, no further actions may be performed because the current operation of the HVAC system 150 sufficiently conditions the air flow 200. Additionally or alternatively, if the pressure of the refrigerant does not exceed the second threshold, no further actions may be performed to avoid reducing the pressure of the refrigerant below the first pressure threshold for operating the HVAC system 150 at or above the desired efficiency level. As such, the HVAC system 150 continues to operate in the modulated reheat mode, and the pressure of the refrigerant is continuously monitored.

However, if the first valve 176 is closed and the pressure of the refrigerant exceeds the second pressure threshold, the first valve 176 may be adjusted to enable refrigerant flow to the second condenser coil 170, thereby enabling the condenser system 162 to operate at full capacity to cool the refrigerant. Since enabling refrigerant flow the second condenser coil 170 reduces the pressure of the refrigerant, the second pressure threshold may be substantially greater than the first pressure threshold of block 328 such that opening the first valve 176 does not reduce the pressure of the refrigerant below the first pressure threshold and cause the first valve 176 to be closed again. Additionally, the second pressure threshold may be substantially greater than the first pressure threshold such that closing the first valve 176 does not increase the pressure of the refrigerant above the first pressure threshold and cause the first valve 176 to be opened again. In other words, the difference between the first pressure threshold and the second pressure threshold may be high enough to avoid constant adjustment of the first valve 176 when the detected pressure deviates from a desirable pressure threshold. In this way, the pressure of the refrigerant may be compared to a range of acceptable pressure values between the first pressure threshold, or the low end of the range, and the second pressure threshold, or the high end of the range.

Moreover, if the detected pressure is below the pressure threshold, the first valve 176 is adjusted to block refrigerant from flowing to the second condenser coil 170, as indicated at block 332. Thus, the second condenser coil 170 is inactive and does not cool the refrigerant. With the second condenser coil 170 not operating to cool the refrigerant, the total refrigerant cooling provided by the condenser system 162 may be reduced. By reducing the cooling of the refrigerant, the pressure of the refrigerant in the condenser system 162 may increase above the pressure threshold. Thus, adjusting the first valve 176 to block the refrigerant from flowing to the second condenser coil 170 may improve the performance of HVAC system 150 components and/or improve the efficiency of the HVAC system 150. After the first valve 176 has been adjusted to block refrigerant flow to the second condenser coil 170, the operating parameter indicative of the pressure of the refrigerant may continue to be monitored.

Embodiments of the present disclosure are directed to an HVAC system having reheat functionality and configured to adjust a flow of refrigerant through a condenser system to change a pressure of the refrigerant. In some embodiments, the condenser system may include a first condenser coil and a second condenser coil. The HVAC system may include a valve configured to block refrigerant flow from a compressor to the second condenser coil, such that the first condenser coil is active and the second condenser coil is inactive. When refrigerant flow to the second condenser coil is blocked, the refrigerant cooling provided by the condenser system may be reduced. As such, the pressure of the refrigerant may be increased, thereby enabling components of the HVAC system to improve operation and enabling the HVAC system to effectively and efficiently condition an air flow via the refrigerant. For example, in certain implementations, the HVAC system may be configured to regulate the flow of refrigerant from the compressor to the condenser system and to a reheat coil so as to change a temperature and humidity of the air flow conditioned by the HVAC system. In some operating conditions, such as when the HVAC system directs a substantial flow of refrigerant to the reheat coil, the condenser system may excessively cool the refrigerant flowing therethrough and thereby reduce the pressure of the refrigerant below a desirable level. As such, the refrigerant may not flow from the condenser system to an expansion valve of the HVAC system at a sufficient flow rate and/or the expansion valve may not effectively function to reduce the pressure of the refrigerant, which may affect the performance of the HVAC system, such as the compressor. Thus, the disclosed embodiments may block the refrigerant flow to the second condenser coil to reduce refrigerant cooling via the condenser system, increase the pressure of the refrigerant, and improve the performance of the HVAC system. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be noted that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) unit, comprising:
   a refrigerant circuit including a reheat coil and a condenser system, the condenser system having a first condenser coil and a second condenser coil;
   a first valve disposed along the refrigerant circuit and configured to direct a first portion of refrigerant flow to the reheat coil and direct a second portion of refrigerant flow to the condenser system; and
   a second valve disposed along the refrigerant circuit downstream of the first valve relative to a direction of the second portion of refrigerant flow through the refrigerant circuit, wherein the second valve is configured to be actuated to control the second portion of refrigerant flow to the second condenser coil.

2. The HVAC unit of claim 1, comprising a controller configured to actuate the second valve during a modulating reheat mode of the HVAC unit to block the second portion of refrigerant flow to the second condenser coil, wherein the first valve directs the first portion of refrigerant flow to the reheat coil and the second portion of refrigerant flow to the condenser system in the modulating reheat mode.

3. The HVAC unit of claim 2, wherein the controller is configured to actuate the second valve based on feedback from a sensor, and the feedback is indicative of an ambient temperature, a head pressure of the HVAC unit, or both.

4. The HVAC unit of claim 1, comprising a fan configured to direct air flow across the first condenser coil and the second condenser coil, wherein the fan is a single speed fan.

5. The HVAC unit of claim 4, wherein the fan is a first fan and the HVAC unit further includes a second fan configured to direct air flow across the first condenser coil and the second condenser coil, and the second fan is an additional single speed fan.

6. The HVAC unit of claim 1, wherein the first condenser coil and the second condenser coil are separate heat exchanger slabs.

7. The HVAC unit of claim 1, wherein the first condenser coil and the second condenser coil are positioned in a parallel arrangement relative to the direction of the second portion of refrigerant flow therethrough.

8. The HVAC unit of claim 1, wherein the refrigerant circuit has an evaporator coil configured to receive refrigerant from the first condenser coil, the second condenser coil, and the reheat coil.

9. The HVAC unit of claim 1, wherein the refrigerant circuit has a compressor configured to pressurize refrigerant and to direct refrigerant to the first valve.

10. A heating, ventilation, and/or air conditioning (HVAC) unit, comprising:
    a condenser system having a plurality of condenser coils disposed along a refrigerant circuit and configured to enable heat transfer between a refrigerant in the refrigerant circuit and an ambient air flow, wherein the condenser system includes a first condenser coil and a second condenser coil;
    a reheat heat exchanger disposed along the refrigerant circuit and configured to enable heat transfer between the refrigerant and a supply air flow;
    a first valve disposed along the refrigerant circuit and configured to direct the refrigerant from a compressor of the refrigerant circuit to the condenser system, the reheat heat exchanger, or both; and
    a second valve disposed along the refrigerant circuit and upstream of the second condenser coil relative to a direction of refrigerant flow through the condenser system, wherein the second valve is positioned downstream of the first valve and upstream of the second condenser coil relative to a direction of refrigerant flow from the first valve to the second condenser coil, and the second valve is configured to selectively control refrigerant flow through the second condenser coil.

11. The HVAC unit of claim 10, wherein the second valve is a solenoid valve configured to adjust to a closed position upon receipt of an electrical signal, wherein the solenoid valve is configured to block the refrigerant flow through the second condenser coil in the closed position.

12. The HVAC unit of claim 11, comprising a controller configured to output the electrical signal to the solenoid valve based on feedback received from a sensor, wherein the feedback is indicative of an operating parameter exceeding or falling below a threshold value.

13. The HVAC unit of claim 12, comprising the sensor, wherein the operating parameter is a temperature of the ambient air flow, a pressure of the refrigerant, a temperature of the refrigerant, a flow rate of the refrigerant, or any combination thereof.

14. The HVAC unit of claim 10, comprising a single speed fan configured to direct air across the first condenser coil and the second condenser coil.

15. The HVAC unit of claim 14, comprising a controller communicatively coupled to the single speed fan, wherein the controller is configured to adjust the first valve to a first position to block refrigerant flow to the condenser system, and the controller is configured to suspend operation of the single speed fan when the first valve is in the first position.

16. The HVAC unit of claim 10, comprising a first check valve and a second check valve, wherein the first check valve is positioned along the refrigerant circuit and within the condenser system downstream of the first condenser coil relative to the direction of refrigerant flow through the condenser system, and the second check valve is positioned along the refrigerant circuit and within the condenser system downstream of the second condenser coil relative to the direction of refrigerant flow through the condenser system.

17. The HVAC unit of claim 10, wherein the condenser system includes a single heat exchanger, the first condenser coil is a first set of tubes of a first slab of the heat exchanger, the second condenser coil is a second set of tubes of a second slab of the heat exchanger, and the first slab and the second slab are arranged in a V-shape configuration.

18. The HVAC unit of claim 10, wherein the condenser system is configured to combine refrigerant from the first condenser coil and from the second condenser coil into a combined refrigerant flow within the condenser system, and the HVAC unit includes an evaporator coil disposed along the refrigerant circuit and configured to receive the combined refrigerant flow from the condenser system.

19. The HVAC unit of claim 10, wherein the condenser system includes more than two condenser coils.

20. A heating, ventilation, and/or air conditioning (HVAC) unit, comprising:
a refrigerant circuit configured to circulate a refrigerant;
a first condenser coil of the refrigerant circuit;
a second condenser coil of the refrigerant circuit positioned in a parallel arrangement with the first condenser coil relative to refrigerant flow through the refrigerant circuit;
a first valve of the refrigerant circuit having an inlet configured to receive the refrigerant from a compressor of the HVAC unit, a first outlet configured to direct the refrigerant toward a reheat coil of the HVAC unit, and a second outlet configured to direct the refrigerant toward the first condenser coil and the second condenser coil;
a second valve of the refrigerant circuit actuatable to block refrigerant flow through the second condenser coil; and
a controller communicatively coupled to the second valve, wherein the controller is configured to:
receive feedback indicative of a pressure of the refrigerant;
operate the HVAC unit in a first operating mode or in a second operating mode based on the feedback;
operate the first valve and open the second valve to enable refrigerant flow through the first condenser coil and the second condenser coil in the first operating mode; and
operate the first valve and close the second valve to block refrigerant flow through the second condenser coil and enable refrigerant flow through the first condenser coil in the second operating mode.

21. The HVAC unit of claim 20, wherein the controller is configured to operate the first valve to enable refrigerant flow through the first outlet, the second outlet, or both.

22. The HVAC unit of claim 21, wherein the controller is configured to operate the first valve to enable refrigerant flow through the first outlet and the second outlet in the second operating mode, such that first condenser coil and the reheat coil are active, and the second condenser coil is inactive.

23. The HVAC unit of claim 21, wherein the controller is configured to operate the first valve to enable refrigerant flow through the first outlet and to block refrigerant flow through the second outlet in a third operating mode, such that the reheat coil is active, and the first condenser coil and the second condenser coil are inactive.

24. The HVAC unit of claim 21, wherein the controller is configured to operate the first valve to adjust a first flow rate of refrigerant flow directed through the second outlet to the first condenser coil and the second condenser coil and to adjust a second flow rate of refrigerant flow directed through the first outlet to the reheat coil.

25. The HVAC unit of claim 20, comprising a first fan configured to direct air across the first condenser coil and a second fan configured to direct air across the second condenser coil, wherein the controller is configured to control operation of the first fan separately from the second fan.

26. The HVAC unit of claim 25, wherein the controller is configured to suspend operation of the second fan in the second operating mode.

* * * * *